Feb. 27, 1934. E. J. HORNUNG 1,948,712
EDUCATIONAL DEVICE OR GAME
Filed Jan. 7, 1932 2 Sheets-Sheet 1

INVENTOR
BY E.J. HORNUNG
D. Clyde Jones
ATTORNEY

Feb. 27, 1934.  E. J. HORNUNG  1,948,712
EDUCATIONAL DEVICE OR GAME
Filed Jan. 7, 1932  2 Sheets-Sheet 2
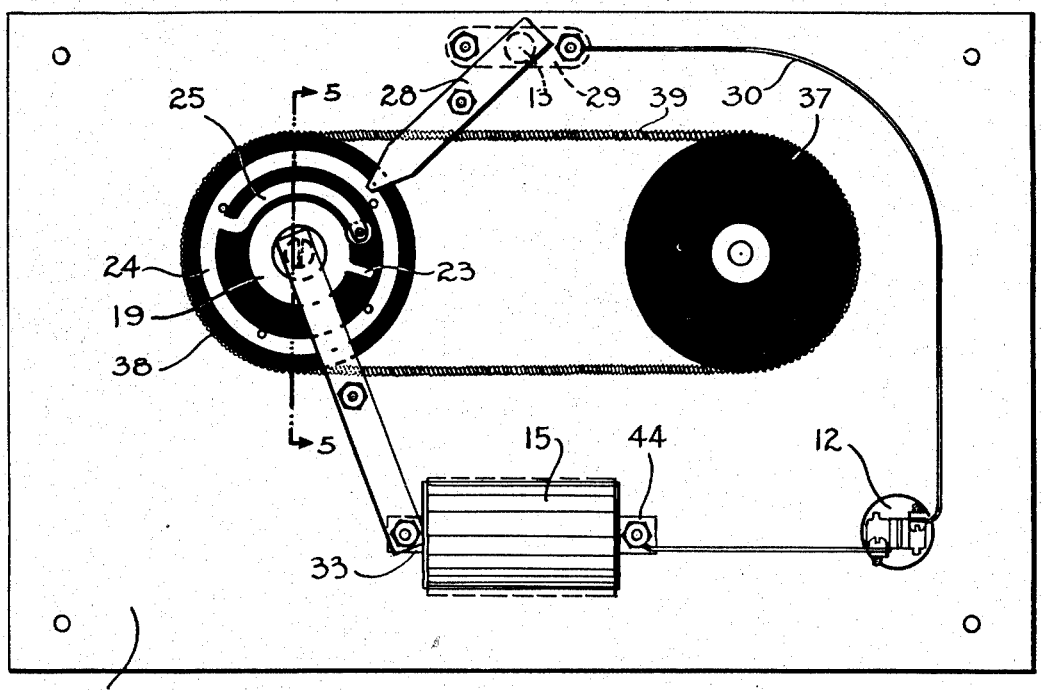
Fig. 3.
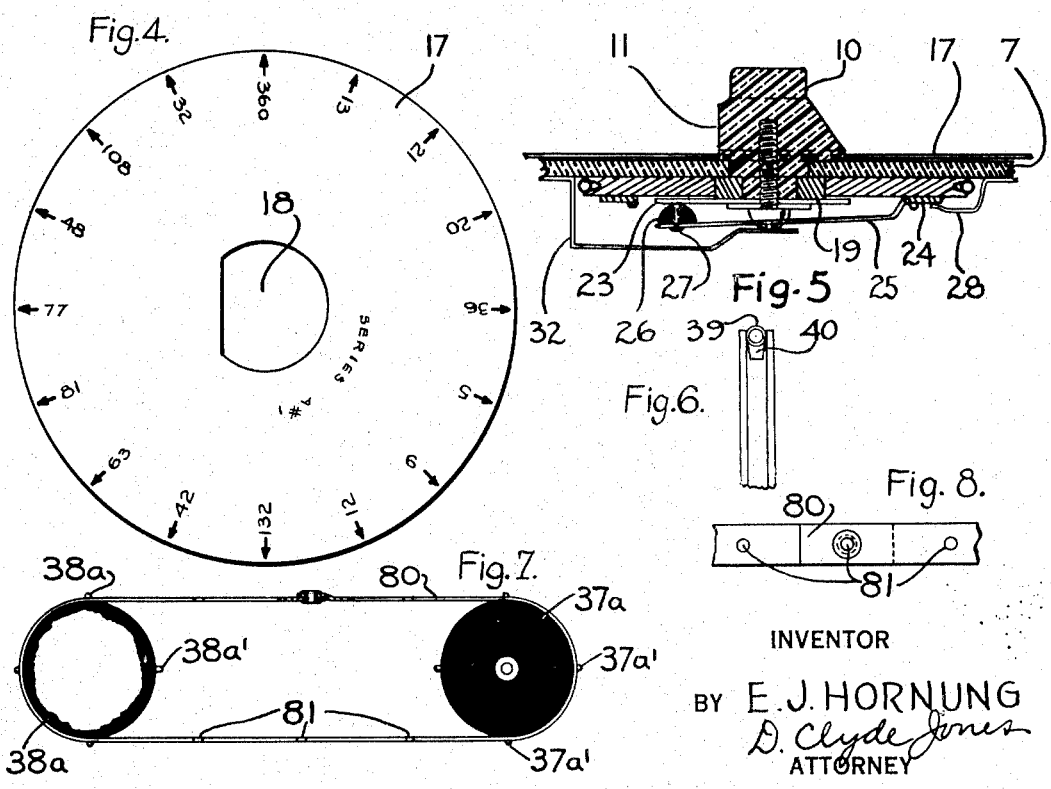
INVENTOR
BY E. J. HORNUNG
D. Clyde Jones
ATTORNEY Patented Feb. 27, 1934

1,948,712

UNITED STATES PATENT OFFICE 1,948,712

EDUCATIONAL DEVICE OR GAME

Elias J. Hornung, Rochester, N. Y.

Application January 7, 1932. Serial No. 585,333

16 Claims. (Cl. 35—2)

This invention relates to educational devices, games, and the like.

The main purpose of the present invention is to provide a game in which a series of co-operating cards having questions and answers thereon may be selectively adjusted by the player to set up an answer for a predetermined question, and in which means including a signalling device, such as a lamp or other alarm operates to indicate the correctness of the answer selected.

Another feature of the invention relates to a series of question cards and answer cards which may be independently rotated by the player to indicate a selected answer for a question, after which the correctness of the selected answer is electrically checked.

A further feature of the invention relates to a plurality of dials having questions and answers thereon, which may be selectively adjusted to select an answer for a question after which the correctness of the answer selected may be electrically checked.

A still further feature of the invention relates to a device having a plurality of rotatable handles or knobs on which any chosen set of a plurality of sets of cards having questions and answers thereon, may be mounted and thereby rotated to the proper position to select an answer for a selected question on the question and answer cards.

Figure 1:
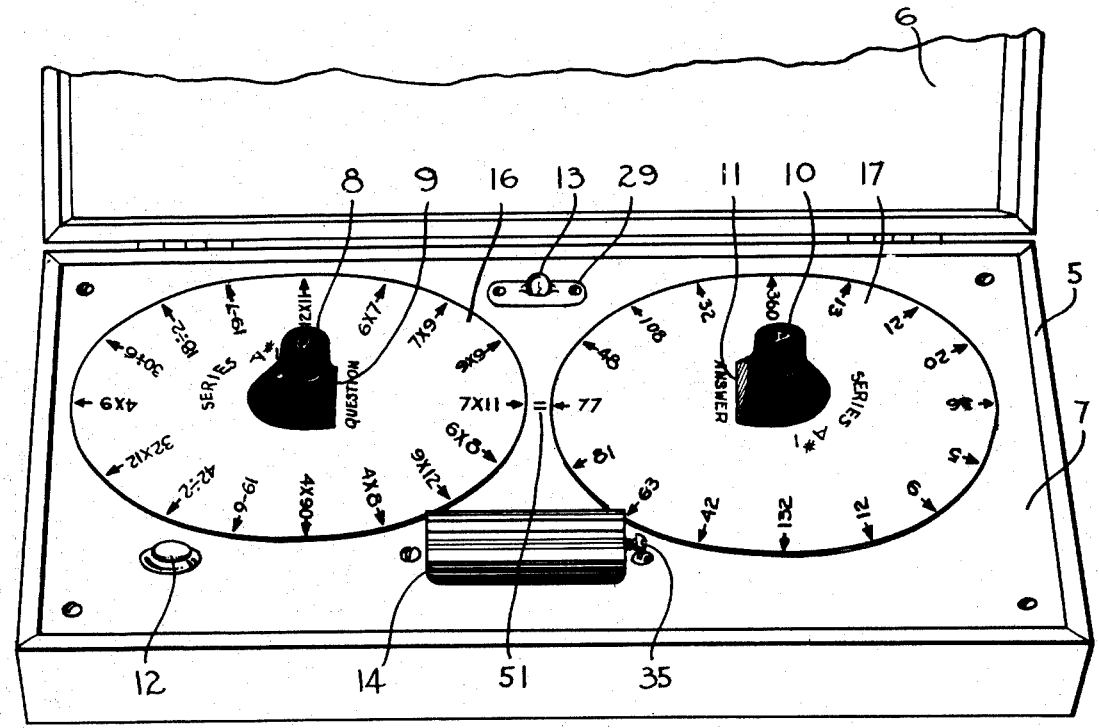
Figure 2:
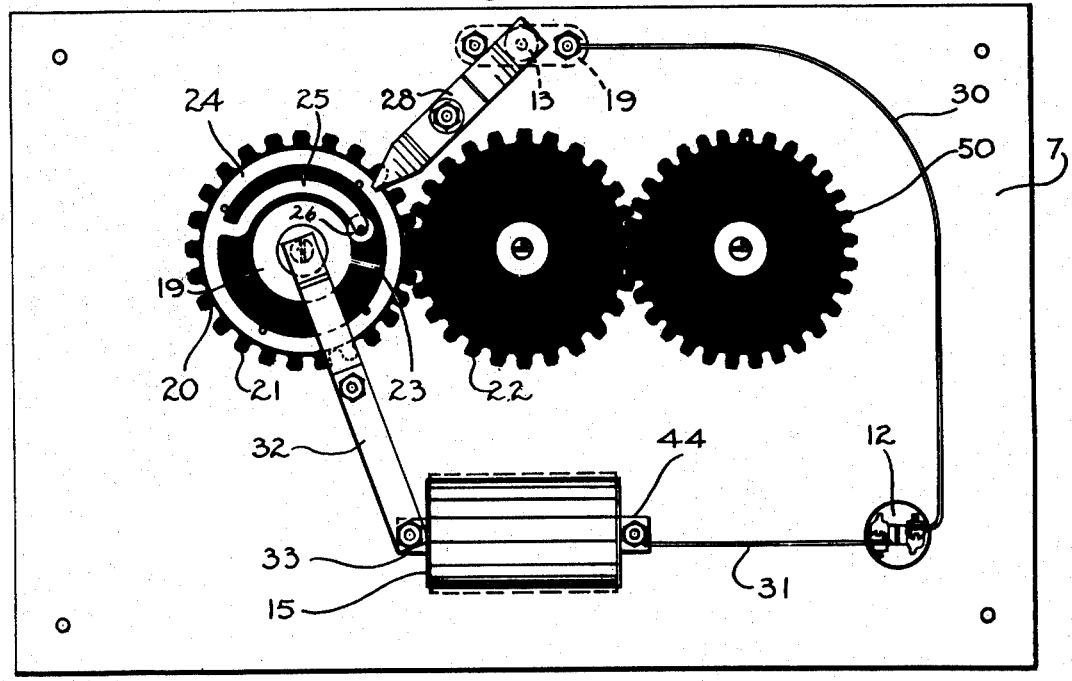

These and other features of the invention will appear from the detailed description and appended claims when taken with the drawings in which Fig. 1 is an isometric view of the top of the device with the cover, a portion of which is broken away, in raised position; Fig. 2 is a bottom view of the panel of the device indicating the operating gears and the electrical devices mounted thereon; Fig. 3 is a bottom view of a similar panel representing a slightly modified form of the invention; Fig. 4 is a top view of an answer card of one of the possible sets of questions and answers that may be used in the device; Fig. 5 is a cross sectional view taken on the line 5—5 of Fig. 3; Fig. 6 is a side view of a portion of a pulley of Figs. 3 and 5; Fig. 7 illustrates a pulley and belt of an additional modified form of the invention; and Fig. 8 is a plan view of a piece of belt used in the arrangement of Fig. 7.

Referring especially to Fig. 1, 5 designates a box which may have a hinged cover 6. In the box there is supported a panel 7 provided on its upper surface with two rotatable knobs or handles 8 and 10, each of which is generally circular except for a slabbed side such as 9 and 11 respectively. In addition there is also mounted on the panel, a push button or other manual switch 12 for controlling a break point in an electrical circuit to be described, a small detachable electric light bulb 13, and a shield 14 which conceals a dry cell 15. The knob 8 has detachably mounted thereon for rotation therewith, a question card 16 with questions printed around its periphery, and the knob 10 has detachably mounted thereon an answer card 17 with answers to the mentioned questions printed around its periphery. Each of these cards preferably has the outline shown in Fig. 4, and is provided with a central opening 18 of such contour as to engage the circular and slabbed side portion of its corresponding knob. It will be understood that there will be provided many sets of question and answer cards (identified by a serial number or a code mark) which may be easily placed on the knobs 8 and 10 and quickly removed so that any set of questions and answers can be replaced at will.

It has been mentioned that the knobs 8 and 10 are rotatable and each knob has a portion extending through the panel on which portion there is mounted below the panel, a rotatable member of insulating material. In the case of the knob 8, the rotatable member attached thereto is in the form of a gear 50, while in the case of the knob 10, the rotatable member is in the form of a disk 19. The disk 19 has mounted thereon for free rotation, an annular disk 20 of insulating material provided on its periphery with gear teeth 21. There is also mounted for rotation on the underside of the panel, an intermediate gear 22 formed of insulating material which meshes with the teeth on the gear 50 and with the teeth on the annular member 20. The arrangement of these gears is such that when the knob 8 is turned, the gear 50 likewise rotates the intermediate gear 22 which in turn rotates the toothed annular member 20, freely on the disk 19. The knob 10, on the other hand, rotates the disk 19 independently of the annular member 20. The disk 19 is provided on its lower face with a conducting plate of generally circular form except for an outwardly extending arm 23 as shown in Fig. 2. The annular member 20 on the other hand is provided with a conducting ring 24 to which there is connected an inwardly extending conducting spring 25. This spring carries a button 26 of insulating material, fastened in position by a conducting pin 27 which pin serves to make electrical contact between this spring and the arm 23 when these portions are in registry. The construction of the insulating button 27 with the pin 26 projecting therethrough, insures that there will be only a momentary contact between the pin 26 and the arm 23 so that there can be only a limited range of accurate adjustment for the knobs 8 and 10 wherein a correct answer is indicated, thereby limiting the possibility of obtaining a correct answer indication by an accidental setting of these knobs.

The conducting ring 24 is engaged by a contactor 28 which is mounted to engage the well-known end contact of electric light bulb 13, while the side contact of this bulb engages the socket 29 mounted in the panel. This socket is connected by a conductor 30 to the push button switch 12, which in turn is connected by conductor 21 to terminal 44 mounted on the panel and conductively engaging the dry cell 15, while the other terminal of this dry cell is conductively engaged by terminal 33 mounted on the panel, which terminal is connected by a spring contactor 32 to the conducting plate on the disk 19. It should be pointed out that the dry cell is supported mainly on the upper side of the panel, and is replaceable by removing the shield 14 and releasing set screw 35. This cell is supported in a rectangular opening in the panel of a length slightly greater than the length of the cell, but the width of this opening is slightly less than the diameter of the cell so that the cell rests on the lateral edges of this panel defining the opening, which edges may be beveled. The terminal 33 mounted on the panel preferably has a resilient portion engaging the center terminal or pole of the cell, while the terminal 43 also mounted on the panel has an upstanding lug (not shown), carrying the set screw 35 (Fig. 1) to engage the bottom of the cell which constitutes its other pole.

In the modified form of the invention illustrated in Fig. 3, the gears 50, 22 and 21 have been replaced by pulley 37, and the annular pulley member 38 (mounted for rotation on disk 19) driven by a spring belt 39. As shown in Fig. 6 the periphery of these pulley members is provided with a wedge shaped recess 40 which is engaged by the spring belt 39 to insure no slippage between these members and the belt.

The modified form of the invention illustrated in Figs. 7 and 8 is similar to that shown in Fig. 3, except that there is provided a pulley member 37a to be actuated by the knob 8, which pulley member is provided with radially extending pins 37a', and the annular pulley member 38a (only the outer periphery of which is shown) replaces the corresponding pulley member of Fig. 3. The pulley member 38a is provided with the radially extending pins 38a'. The pins 37a' and 38a' are engaged by a flat belt 80 having openings or eyelets 81 therein, in which these pins enter.

In operating the device, a set of question and answer cards such as, 16 and 17 are respectively placed on the knobs 8 and 10, thereafter, the knob 8 is rotated to position the question such as, "7×11" opposite the equality marks 51, then the knob 10 is rotated to position the answer "77" opposite these equality marks. Since the correct answer has been selected, if the push button 12 is depressed, the lamp 13 will be lighted to indicate that the answer is correct. If, however, an incorrect answer had been positioned opposite the equality marks, the lamp 13 would not light when the push button 12 was depressed. In the selection of the question, that is, placing the problem "7×11" opposite the equality marks, the rotation of the knob 8 likewise rotates the gear 50 through intermediate gear 22 rotates the annular member 20 thereby properly positioning the pin 27 carried on spring 25. Then when the knob 10 is rotated to position the selected answer opposite the equality marks 51, the rotation of this knob rotates the disk 19 to position the arm 23 on its conducting plate in engagement with the pin 27, so that when the push button 12 is depressed, a circuit is completed for lighting the lamp 13. This circuit may be traced as extending from one pole of the dry cell 15, terminal 44, conductor 31, contacts of push button 12 now closed, conductor 30, socket 29, lamp 13, spring 28, conducting ring 24, spring 25, pin 27 (Fig. 5), conducting arm 23 and its conducting plate, contactor 32, terminal 33 to the other pole of the dry cell.

The operation of the modified form of the invention shown in Fig. 3 is similar to the operation of the arrangement shown in Fig. 2, except that the rotation of the knob 8 rotates the pulley 37 instead of the gear 50 and the pulley 37 through belt 39 rotates the annular pulley member 38 on the disk 19, instead of the annular gear member 20. It will be understood that this adjustment of the annular member 38 affects the proper setting of the pin 27 on the spring 25, so that when the knob 10 rotates the disk 19, identical with that shown in the first mentioned description, the arm 23 is positioned in contact with the pin 27, so that the depressing of the push button 12 completes a circuit identical with that previously described for lighting the indicating and checking lamp 13.

The operation of the modified form of the invention shown in Figs. 7 and 8 is similar to that shown in Fig. 3 except that the belt 20 co-operates with the pulley members 37a and 38a in a manner to prevent any slippage.

While the lamp has been shown as the means for indicating the selection of the correct answer for the selected question, any other indicating device such as an electrical buzzer may be substituted therefor, or both a lamp and a buzzer may be employed simultaneously as desired.

The present disclosure is mainly typical of two possible forms of applicant's invention, but it will be appreciated that there may be many modifications and variations thereof within the scope of the appended claims, without departing from the spirit of this invention.

What I claim is:—

1. In a device of the character described, a question member bearing indicia forming questions, an answer member bearing indicia forming answers, each member being rotatable to associate a selected question with a selected answer, a circuit including a source of current and an indicator, said circuit having at least one break point therein, and means actuated by said members in the association of a correct answer with a selected question for closing said break point.

2. In a device of the character described, a question member bearing indicia forming questions, an answer member bearing indicia forming answers, each member being rotatable to associate a selected question with a selected answer, a circuit including a source of current and an indicator, said circuit having at least two break points therein, means actuated by said members in the association of a correct answer with a selected question for closing one of said break points, and a manual switch for closing said second break point.

3. In a device of the character described, including a panel, a pair of knobs rotatable on said panel, a pair of cards mounted on said knobs for rotation therewith, one of said cards bearing indicia forming questions, the other of said cards bearing indicia forming answers for said questions, a portion of each of said knobs extending through said panel, a generally circular member secured to the mentioned portion of each knob for rotation therewith, one of said members being provided with a projecting conducting element, said last-mentioned member having rotatably mounted thereon an annular element provided with a conducting portion to engage said extension, means actuated by the rotation of the other member for rotating said annular element with respect to its related member, a circuit including a source of current, a manual switch, and a signal, and contactors extending the mentioned portion of said circuit to said conducting element and to said conducting portion.

4. In combination, a support provided with a pair of rotatable knobs in adjacent relation, a pair of cards, one card bearing indicia forming questions being mounted on one knob, and the other card bearing indicia forming answers for said questions being mounted on the other knob, said knobs being rotatable to associate a selected answer with a selected question, and means for indicating the correctness of the selected answer.

5. In a device such as described, a pair of rotatably mounted members, a normally open electrical circuit, a contact in said circuit movable in a rotary path by one of said members into a predetermined position, another contact in said circuit movable in a rotary path by the other of said members into contact with the first-mentioned contact to close said circuit, a removable question member associated with and rotatable with one of said members, and a removable answer member associated with and rotatable with the other of said members.

6. In a device of the character described, a movably mounted member carrying indicia presenting problems to be answered, a movably mounted answer member carrying indicia representing the answers to the problems on the first member, said members being movable to associate a selected answer with a given problem, a signalling circuit, and means for altering the current conducting condition of said circuit upon the association of a selected answer with a given problem.

7. In a device of the type embodying an electric signalling circuit, a member bearing question symbols to be answered, a member bearing answer symbols to the questions, and means for closing the circuit upon the selection of the correct answer to a question, the combination with the circuit, of a movable member carrying a plurality of questions, and a cooperating movable member carrying a plurality of answers.

8. In a device such as described, the combination of a rotary card in the form of a disk carrying at different points at its periphery indicia presenting questions to be answered, a second disk like card carrying at its periphery indicia representing the answers to the questions on the first card, means for mounting said cards so that they are side by side and rotatable to bring a selected answer into opposition to a selected question, a signal, and means for actuating the signal when the correct answer to a question is brought into position.

9. In a device such as described, freely rotatable knobs arranged side by side, removable cards on the respective knobs, one of said cards carrying questions on its periphery and the other card carrying answers on its periphery, a circuit, and means for changing the current conducting condition of said circuit when a question on the question card is rotated into a predetermined angular questioning position and the correct answer to said question thereafter rotated into a predetermined angular answering position.

10. In a device such as described, freely rotating knobs arranged side by side, removable cards on the respective knobs, one of said cards carrying question symbols on its periphery and the other card carrying answer symbols on its periphery, a signal, and means for actuating the signal when a question on the question card is moved by rotation of said card into a predetermined angular position adjacent the other card and an answer on the other card then brought by rotation of said card adjacent and opposite to the said question.

11. In a device such as described, a signalling circuit, two contacts for closing said circuit, both movably mounted, means for moving one of said contacts through a predetermined path, means for moving the other contact in a predetermined path in the course of which it meets and contacts with the first contact, and movable indicia-bearing members which are brought into position for correctly answering a selected question by the positioning of the contacts in circuit-closing position.

12. In a device such as described, a signalling circuit having as a part thereof, two movable contacts adapted to make contact with each other to close the circuit, a member for moving one of said contacts through a predetermined orbit, a member for moving the other contact through a predetermined orbit in the course of which it meets and makes contact with the first-mentioned contact to close the circuit, and indicia-bearing members removably associated with the respective first-named members, one of said indicia-bearing members carrying a plurality of questions and the other indicia-bearing member carrying a plurality of answers to the questions on the first member, said contacts being actuated to close the circuit only when the correct answer on one of said members is brought into association with a selected question on the other member.

13. In a device such as described, a signalling circuit having as a part thereof, two movable contacts adapted to make contact with each other to close the circuit, a member for moving one of said contacts through a predetermined orbit, a member for moving the other contact through a predetermined orbit in the course of which it meets and makes contact with the first-mentioned contact to close the circuit, and indicia-bearing members removably associated with the respective first-named members, one of said indicia-bearing members carrying a plurality of questions and the other indicia-bearing member carrying a plurality of answers to the questions on the first member, said contacts being actuated to close the circuit only when the correct answer on one of said members is brought into association with a selected question on the other member, said first-named members being in the form of rotatable knobs and said indicia-bearing members being in the form of cards applicable to and rotatable by and removable from said knobs, each card being applicable to its knob only in a single predetermined angular relation thereto.

14. In a device such as described, a card carrying a plurality of questions, another card carrying a plurality of answers, movable mountings for the respectve cards arranged side by side so that visually a question on one card can be moved into cooperative adjacent relation to an answer on the other card, the questions on one of said cards having positions corresponding to the positions of the answers on the other card, and signalling means brought into operable condition upon the association of a correct answer with a selected question.

15. In a device such as described, a disk-like card having question symbols in a circular series on its face, a disk-like card having on its face a circular series of answer symbols corresponding in position to the questions on the first card, means mounting said cards so that they are located side by side and rotatable so as to bring symbols representing a question and symbols representing the correct answer thereto into registering adjacent relation at the periphery of the cards, and means for giving an indication of the registry of the correct answer symbols to the selected question symbols.

16. In a device such as described, a signalling circuit, two contacts for closing said circuit, both movably mounted, means for moving one of said contacts through a predetermined path, means for moving the other contact through a predetermined path in the course of which it meets and contacts with the first contact, the point at which said contacts meet being variable, and movable members carrying question symbols and answer symbols respectively which are brought into position for correctly answering a selected question on the meeting of the contacts in circuit-closing position, the different points at which said contacts meet corresponding to the different question-symbols on the question-symbol carrying member.

ELIAS J. HORNUNG.